United States Patent Office 3,211,518
Patented Oct. 12, 1965

---

3,211,518
FINE SIZED POWDERS OF THORIA, URANIA AND MIXTURES THEREOF AND METHODS FOR THEIR PREPARATION
Ellsworth G. Acker, Baltimore, Moises G. Sanchez, Glen Burnie, and Milton C. Vanik, Brookeville, Md., assignors to W. R. Grace & Co., New York, N.Y., a corporation of Connecticut
No Drawing. Original application Feb. 8, 1960, Ser. No. 7,079. Divided and this application Apr. 23, 1963, Ser. No. 280,180
2 Claims. (Cl. 23—14.5)

This application is a division of application Serial No. 7,079, filed February 8, 1960, now abandoned.

This invention relates to the preparation of dry, colloidal sized thoria, urania or thoria-urania powders which may be redispersed in water or organic liquids for use as fuels in aqueous homogeneous reactors. More particularly, this invention relates to the preparation of colloidal sized hydrophilic powders or organophilic powders of thoria, urania or thoria-urania which are useful in the preparation of the fuel elements for liquid homogeneous reactors.

Liquid homogeneous reactors may be one of three types: burner reactors, converter reactors or breeder reactors. Burner reactors are those in which fissionable materials are consumed as fuels but virtually no fuel is generated. Converter reactors are those which produce a different fissionable fuel than is destroyed in the fission process. Breeder reactors are those which produce more of the same type of fissionable fuel as is being consumed in the reactor.

The nuclear reactions involved in liquid homogeneous reactors of this type are well known. A typical example is a two region reactor using a mixed thoria-urania sol as a fuel. In this reactor, a core of uranium solution is surrounded by a blanket of thorium 232. As the uranium in the core fissions, it gives off neutrons, some of which are absorbed by the thorium 232 to convert it to thorium 233. Thorium 233 decays with half life of 23.3 minutes to yield protactinium 233 which in turn decays to uranium 233. Uranium 233 is a fissionable uranium isotope and is itself a suitable fuel. These breeder reactors may also be designed as single region reactors which contain a homogeneous mixture of fissionable and fertile material in a moderator. Breeder reactors differ from single region reactors in that they have larger diameters in order to minimize neutron losses.

The dry hydrophilic colloidal sized powders of thoria, urania or thoria-urania of this invention find particular application where it is desirable to transfer an aqueous sol to a heavy water sol or where it is desirable to increase the concentration of an aqueous sol by preparing the dry hydrophilic powder and redispersing it in a smaller quantity of water. The dry organophilic colloidal sized powders are particularly useful when it is desirable to prepare a sol in a high boiling organic material such as biphenyl for use as a moderator in a homogeneous reactor.

Liquid homogeneous reactors have several advantages over conventional type reactors used in nuclear power development. Briefly, these advantages reside in a higher power density than is available in a heterogeneous reactor, the ease with which fuel can be added to and fission products removed from the reactor system and the wide size latitude a liquid homogeneous reactor system allows, thus making possible reactors which range in size from very small units to reactors large enough to be utilized in nuclear power plants.

The prior art systems depended on the use of uranyl sulfate or uranyl phosphate in solution as a fuel in the aqueous homogeneous reactors. These reactor systems have not been particularly satisfactory because both the sulfuric acid and phosphoric acid systems show a definite tendency toward corroding the equipment. Sulfur has an appreciable adsorption cross-section so that neutron economy was also a factor to be considered.

Because of these disadvantages, considerable effort was expended toward preparing fuel systems which comprised solids, such as $UO_3$, which were placed in the reactor in slurry form. These slurries had several obvious disadvantages such as the erosion of the equipment and attrition of the materials themselves.

It has been recognized that these problems can be solved by using sols or dispersions of finely divided spherical shaped particles of urania, thoria or thoria-urania as fuels in liquid homogeneous reactors. These types of sols have the advantage of being homogeneous particles of colloidal size and have been found to avoid the disadvantages that are present when thoria or urania slurries are used. In sols, there is, for example, no need to furnish agitation to prevent solids separation. These particles are not subject to attrition and, because of the small spherical shaped particles of the sols, the problem of erosion of equipment is not important. Sols have relatively low viscosities and thus can be easily pumped.

The method of preparing aqueous metal oxide sols which are useful in aqueous homogeneous reactors and are amenable to coating with silica has been disclosed previously. Briefly, these sols may be prepared, for example, by dissolving a suitable salt of a uranium, thorium or mixed thorium-uranium in deionized water. The preferred salts are the nitrates or chlorides. This solution is placed in a suitable vessel, part of the solution is withdrawn and this portion is passed through the cathode compartment of an electrodialysis cell divided by a membrane of an ion exchange resin. This portion is then returned to the larger body of solution which is being maintained at an elevated temperature and this withdrawnl, dialysis and addition back is continued until the solution is essentially electrolyte free. The product sol is then densified by heating under non-evaporative conditions and the dense sol passed through an ion exchange resin to remove electrolytes. These sols may then be clad with silica or some other suitable material such as certain phosphates. Hydrous silica can be used to coat the particles with silica. These sols are stable at the temperatures employed in nuclear reactors. The resulting product is a hydrous oxide sol which is dispersed in an aqueous medium.

We have found that aqueous sols of thoria, urania or mixtures of thoria and urania can be converted to alcohols and processed to prepare dry colloidal sized (in the range of 200 to 2000 angstroms) thoria, urania or thoria-urania powders which are either organophilic or hydrophilic. The organophilic powders are useful in preparing moderators in organic compounds for use in liquid homogeneous reactors. Organophilic and hydrophilic powders are both useful when it is desired to concentrate the sol by removing the water and redispersing in a smaller quantity of water or when it is desirable to transfer the sol from normal water to heavy water. These dry hydrophilic powders can be prepared by the process which comprises passing an aqueous sol of the type set out above through an ion exchange resin column, treating the deionized sol with an agent capable of neutralizing the charge on the particle which acts as a flushing agent, that is, an agent that aids in the transfer of particles from an aqueous to an organic liquid, followed by the removal of the water from the resulting sol or suspension by azeotrope distillation from the organic medium. The colloidal sized particles of the dry thoria, urania or thoria-urania powders of this invention can be prepared by passing an aqueous sol of the type set out above through an ion exchange resin column, treating the deionized sol with an agent capable of neutralizing the charge on the particle and which also acts as a flushing agent, followed by dispersion of the colloidal sized particles in alcohol. The water is removed by azeotrope distillation at the boiling point of the water azeotrope while adding fresh, dry alcohol to replace volume and the resulting sol is refluxed at the boiling point of the alcohol for a period of about two hours in order to thoroughly react the butyl alcohol with the silica surface.

The first step in the treatment of the aqueous sols is the ion exchange treatment. We prefer to use a mixed hydrogen-hydroxyl exchange resin to deionize the sols. Examples of suitable resins include certain cationic resins in the hydrogen form such as, for example, the commercial resin Dowex 50 and strong anionic resins in the hydroxyl form such as, for example, the commercial resin Amberlite IRA-400.

The alcohols used in this process are primary and secondary monohydric alcohols with at least four carbon atoms. Examples of the alcohols of this class are normal straight chain alcohols such as n-butyl, n-amyl, n-hexyl, n-heptyl, n-octyl, etc.; branched chain primary alcohols such as isobutyl, isoamyl, 2,2,4-trimethyl, 1-hexanol, etc.; secondary alcohols such as sec-butyl, 2-pentanol, 2-octanol, etc.

The flushing and neutralizing agent used in the second step of these processes should be selected so that it is capable of neutralizing the charge on the particles to protect them from aggregation by coating the particles with the agent. Thus, if a silica-clad sol is used, the charge on the particle is negative, so a cationic agent should be chosen. Suitable cationic agents include, for example, n-heptylamine, n-hexylamine, n-octaylamine, n-nonylamine, n-decylamine, etc. The preferred agents include n-heptylamine and n-octylamine. When the sol is not coated, the charge on the particle will be positive and an anionic agent must be used to neutralize this charge and coat the particle to prevent aggregation. Suitable anionic agents include straight chain fatty acids such as caproic, heptoic, caprylic, etc.; branched chain fatty acids with limited water solubility such as isovaleric, isocaproic, etc., or phenyl derivatives of fatty acids such as α-phenyl propionic acid, etc. The preferred agent is a high boiling point organic acid such as decanoic acid.

The temperature of operation of the process disclosed in this invention is of course dependent on the boiling point of the alcohol water azeotrope in the dehydration step and the boiling point of the alcohol in the stabilization step. Suitable results have been obtained in preparing sols in butyl alcohol, for example, by operating in the range of 90 to 150° C. The preferred temperature for this step is 92 to 120° C. when the butyl alcohol sols are being stabilized. The other steps of the reaction are conventional. The sols are dehydrated using conventional vacuum or air-drying techniques. Redispersion in many instances is effected by the simple expedient of adding the appropriate quantity of the material in which the sol is to be dispersed and stirring until dispersion occurs.

*Example I*

A dry thoria powder was prepared by dehydration of an aqueous sol prepared as follows: 4000 grams of a solution of thorium nitrate and deionized water containing 10% by weight equivalent $ThO_2$ was charged into a heated reservoir for use in preparing a thoria sol. This sol was circulated at a rate of approximately 150 cc./min. through the cathode compartment of an electrodialysis cell divided by an ion exchange membrane of Amberplex A1. The temperature in the reservoir was maintained at 82 to 97° C. Thorium nitrate solution was withdrawn from this vessel at a rate of 150 cc./min. through a cooled heat exchanger and pumped into the above described cell. The temperature of the incoming solution was controlled to maintain a cell temperature of about 25 to 32° C. The solution leaving the cell was passed through a heat exchanger where it was heated to 92 to 97° C. and then returned to the reservoir. Evaporation losses were compensated for by the addition of deionized water as needed. Circulation of the solution was continued over a total period of about 30 hours. During electrolysis the amperage dropped from about 10 to a value of about 1.5. The pH rose from about 2 to about 6.7.

The thoria sol was coated with silica using the following technique: Several liters of silica sol were prepared by passing a nominal 2% silica-sodium silicate solution through an acid regenerated ion exchange resin. Two liters of this freshly prepared silica sol was added rapidly with vigorous agitation to 2 liters of thoria sol described above which had been further deionized by passing it through an ion exchange resin. An additional 2 liters of the silica sol was added somewhat more slowly to yield a final silica-clad sol. A total of 415 ml. of 1 normal sodium hydroxide was added to adjust the pH and the entire system was refluxed at 100° C. for 24 hours. The refluxed sol was then passed through a cation deionizing resin to give a product sol. The pH of the sol was adjusted by the addition of 50 cc. of 1 normal sodium hydroxide.

A portion of this silica-clad thoria sol containing 6% solids was passed through a mixed bed ion exchange resin to remove electrolytes. A charge of 200 grams of the deionized sol having a pH of 4.5 was cooled to 5° C. and placed in a three-neck flask and 3 grams of n-heptylamine was added rapidly. After addition of amine, the pH had risen to 12.2. The mixture of the solids and amines was stirred for 15 minutes and a 50 ml. portion of the treated sol and 50 ml. n-butyl alcohol were shaken together in a separatory funnel. The sol particles transferred to the butyl alcohol on standing at room temperature over a period of 20 hours, and the water layer was then removed from the bottom of the separatory funnel. The solids in butyl alcohol were allowed to stand at room temperature for an additional 48 hours and were centrifuged at the end of this time because some flocculation had occurred in the butyl alcohol layer. The solids were separated and air-dried. The powdered material at this point contained some heptylamine as was evidenced by strong odor of the amine. The product was examined in the electron microscope and it was found that the particle size of the powder was very nearly the same as the particle size of the parent sol, that is, about 250 to 1000 angstroms. There were very few aggregates in this material and the aggregates that were found were only loosely organized. The powder was hydrophilic as was demonstrated by readily redispersing the powder in deionized water.

It is apparent from these data that the dry hydrophilic powder can be prepared by transferring the sols to n-butyl alcohol with the aid of a flushing agent, centrifuging out the particles in the butyl sol, and air-drying the collected particles.

*Example II*

A dry hydrophilic silica-clad thoria powder was prepared by the n-heptylamine process. In this run 200 grams of a silica-clad thoria sol containing 6% solids, prepared in accordance with the method set out in Example I above, was passed through a mixed bed ion exchange resin. The pH of the sol was reduced to 4. A charge of 5 grams of n-heptylamine was added rapidly with stirring to the sol at room temperature and the pH rose to 11. Increasing the pH caused the sol particles to flocculate and the solid particles were separated by centrifuging at 2000 r.p.m. The solids were removed from the centrifuge and dried at 100° C. for one hour followed by heating to 150° C. for two hours to remove the largest portion of the n-heptylamine still present in the powdered material. This powder was examined in the electron microscope and found to be composed of particles of essentially the same size as the particles of the parent material. However, there were some aggregates of the individual spherical particle measuring about 5 microns in size.

The dried powder was hydrophilic as was evidenced by the fact that it was readily dispersed in deionized water to give a dispersion of 33% solids. The hydrothermal stability of this dispersion was checked by heating this suspension in a Vycor tube at 270° C. for 24 hours. At the end of this time the dispersion was examined visually. There was no evidence of gelation or hard caking of the material.

This example illustrates that a suitable hydrophilic powder can be prepared by flocculating the sol with a suitable amine, collecting the flocculated materials, and drying at a low temperature.

*Example III*

An alternative method of preparing dry hydrophilic powder of thoria, urania and thoria-urania is illustrated by the process described below. In this run a silica-clad thoria sol containing 6% solids, prepared in accordance with the procedure described in Example I, was passed through a mixed bed ion exchange resin to remove the electrolytes. A portion, 1000 ml., of this sol was transferred to a resin kettle fitted with a dropping funnel, a stirrer, distillation equipment and a heating mantle. The stirrer was started and the temperature taken up to 92.5° C. at which point 1000 ml. of butyl alcohol was added to the sol continually over a period of 2½ hours. The temperature was maintained at 92.5° C. and the water removed by azeotropic distillation of the alcohol-water azeotrope. The distillation was continued with the continuous addition of butyl alcohol to replace the volume of liquid lost by the distillation and the temperature was slowly brought to 118° C., the boiling point of butyl alcohol. At this point it was noted that there was a tendency of the solids to settle from the sol so the heating was discontinued and the product at this point was divided into two parts. One of these materials was collected on a filter, dried at 80° C. under vacuum and calcined at 1400° F. The other portion, which passed through a filter, was evaporated down to the solids at room temperature and the resulting solids dried at 80° C. under vacuum for 6 hours. The powder that had been collected on the filter and calcined was examined in the electron microscope and found to be composed in part of particles of the same size as the parent sol, that is, about 250 to 1000 angstroms. However, there were several aggregates having a particle size of about 2 microns. The powder was hydrophilic as demonstrated by the preparation of a dispersion in deionized water containing 40% solids. The thermal stability of this dispersion was checked by heating it in a Vycor tube at a temperature of 270° C. for a period of 24 hours. On visual examination of the tube at the end of this period there was no evidence of permanent changes in the dispersion. The portion of the sol that passed through the filter and was merely dried at 80° C. under vacuum was compared with the parent sol in the electron microscope. The micrograph of the second powders indicated that there were a large number of particles of the same size as the parent sol, that is, about 250 to 1000 angstroms. However, there, were some aggregates on the order of 3 to 4 microns in diameter.

This example illustrates that hydrophilic powders can be prepared by a direct removal of water by azeotrope distillation in the presence of a suitable alcohol. The powders consisted of a large number of particles of the same size as the original sol. However, there were some loosely organized aggregates having particle sizes in the range of 1 to 3 microns. These particles are unique in that they exist in the small spherical shaped particles of the order of 250 to 1000 angstroms or loosely organized aggregates of same. These particles may be optimum size and shape to eject nuclear fission by-products and to prevent erosion due to the spherical shaped surfaces.

*Example IV*

A method of preparing a hydrophilic material that was reduced to the powdered form was demonstrated in a run in which a thoria sol was treated with a strong organic quaternary amine base. In this run a silica-clad thoria sol containing about 9% solids, prepared in accordance with the method set out in Example I, was passed through a mixed bed ion exchange resin to remove the electrolytes. The pH of the deionized sol was 3.8. A 100 ml. portion of the sol was transferred to a suitable vessel and sufficient aqueous tetramethyl ammonium hydroxide (10 grams of a 10% solution of the base) was added to give a concentration of ten parts of the reagent in ninety parts of silica thoria sol. This treatment did not flocculate the sol particles as was expected so that the sol was evaporated down to a viscous material by applying heat. At this point the product was a resinous mass. The product was dried at 80° C. under vacuum. The dried product still contained tetramethyl ammonium hydroxide and was shown to be hydrophilic by dispersing a portion of the product in deionized water to form a stable sol.

These data illustrate that a hydrophilic material can be prepared by the addition of tetramethyl ammonium hydroxide to a silica thoria sol and demonstrate that this material could be redispersed in water to form a sol.

*Example V*

A hydrophobic silica-clad powder of thoria, urania or thoria-urania can be prepared by evaporation of a dehydrated butanol sol of these materials. This was demonstrated by a run in which 250 grams of an aqueous 6% silica-clad thoria sol, prepared in accordance with the method set out in Example I, was treated with 3.5 grams of n-heptylamine to give a 19% concentration of the amine as to total solids. The amine treated sol was aged for 15 minutes and then shaken with 250 ml. of n-butyl alcohol in a separatory funnel. The alcohol water slurry was allowed to stand at room temperature for a period of 20 hours after which the water had separated out and was removed from the bottom of the funnel, leaving the sol particles in the butanol. This butanol sol containing some water was transferred to a resin kettle equipped with a stirrer, condenser and a dropping funnel. The temperature was raised to 92.5° C. and the water was removed by distillation of the butanol water azeotrope. As the distillation continued, any loss of volume was replaced by the adidtion of butanol. The temperature rose to 118° C., indicating that essentially all the water had been removed. Refluxing of the butyl alcohol sol was carried out at 118° C. for a period of 2 hours. The sol was concentrated by distilling off the butyl alcohol. The product was dried at 80° C. for 2 hours to give a hydrophobic powder of silica-clad thoria.

The product was examined in the electron microscope and found to be composed of particles having a particle size essentially the same as that of the parent sol, that is, 250 to 1000 angstroms. The organophilic property of the solids was demonstrated by redispersing the solids in sufficient n-butyl alcohol to give a 10% sol. This sol was readily formed and gave all the outward appearances of the butyl alcohol sol from which the powder was prepared.

*Example VI*

A hydrophobic silica-clad thoria sol was prepared using the same quantities and the same procedure as in Example V except that 4.5 grams of n-heytylamine were added to give a n-heptylamine concentration of 14% n-heptylamine. The dry powder, which was the product after evaporation of the butyl alcohol, was examined in the electron microscope and found to consist of particles of the same size as the parent sol; that is, having the particle size distribution of 250 to 1000 angstroms. The hydrophobic properties of this powder were demonstrated by preparing a 10% solid sol in butyl alcohol. The solids dispersed readily in the butanol and had all the external characteristics of the butanol sol from which the powder was prepared.

*Example VII*

Another hydrophobic silica-clad thoria powder was prepared using the same quantities and the same reaction conditions as in Example V except that 2.3 grams of amine were added to 500 grams of 6% silica-clad thoria sol to give a n-heptylamine concentration of 7%. The butyl alcohol was removed as before and the dry powder examined in the electron microscope and found to consist of small particles having a particle size in the range of 250 to 1000 angstroms. The organophilic properties of these products were demonstrated by preparing a normal butyl alcohol sol of these powders by adding sufficient powder to the butyl alcohol to form a sol containing 10% solids. This sol was readily formed and gave all the outward appearances of the parent sol. The same powder can be converted to an aqueous sol of the silica-clad thoria (20% solids and greater) by addition of the powder to boiling water containing a small amount of NaOH.

*Example VIII*

A thoria powder was prepared and coated with pyrophosphate. In this run a thoria sol, containing 10% thoria, prepared by using the electrodialysis technique described in Example I was treated with sodium pyrophosphate. A 100 gram portion of the thoria sol (10% $ThO_2$) was transferred to a beaker and 12.6 grams of sodium pyrophosphate ($Na_4P_2O_7 \cdot 10H_2O$) in 100 ml. of distilled water was added. The mixture was heated to 70° for about fifteen minutes. The pH of the mixture was checked and found to be 10.5. The mixture was allowed to stand at room temperature for about 20 hours. The solids had partially separated at the end of this time so the supernatant liquid was decanted. The residue was divided into two portions for water removal. One portion was air-dried by allowing the liquid to evaporate at room temperature. The other portion was dried at 70° C. to remove essentially all the liquid. This portion was then heated at 100° C. for two hours. The dried powders were redispersed in water. The true sol characteristics of these aqueous dispersions were demonstrated by the fact that they passed readily through a No. 2 filter paper and left essentially no residue on the paper.

*Example IX*

An uncoated thoria powder was prepared using the technique described in Example VIII. A thoria sol, containing 10% $ThO_2$, prepared by electrodialysis according to the method described in Example I was evaporated to dryness at low heat. This powder was removed from the vessel and redispersed in water by adding the powder to a quantity of deionized water. This dilute sol was evaluated by passing it through a filter paper. The colloidal size of the particles was demonstrated by the fact that the sol passed through a No. 2 filter paper without leaving any significant amount of residue on the paper.

Obviously many modifications and variations of the invention as hereinabove set forth may be made without departing from the essence and scope thereof and only such limitations should be applied as are indicated in the appended claims.

We claim:

1. A method of preparing dry, finely divided powders from aquasols containing sol particles of silica-clad actinide oxides selected from the group consisting of urania, thoria, and mixtures thereof which are capable of being redispersed in a liquid medium to form a stable sol comprising the steps of dispersing the aquasol in an alcohol, removing the water from the dispersion by azeotropic distillation, separating the sol particles from the alcohol, and drying the sol particles.

2. The method of claim 1 wherein the alcohol is butanol.

References Cited by the Examiner

UNITED STATES PATENTS

| | | | |
|---|---|---|---|
| 2,692,863 | 10/54 | Iler | 252—313 |
| 2,786,042 | 3/57 | Iler | 252—313 |
| 2,885,366 | 5/59 | Iler | 252—313 |
| 3,091,592 | 5/63 | Fitch et al. | 252—301.1 |
| 3,097,175 | 7/63 | Barrett et al. | 252—301.1 |

CARL D. QUARFORTH, *Primary Examiner.*